United States Patent
Ori

(10) Patent No.: US 7,800,834 B2
(45) Date of Patent: Sep. 21, 2010

(54) ZOOM LENS AND IMAGING APPARATUS

(75) Inventor: Tetsuya Ori, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 209 days.

(21) Appl. No.: 11/892,120

(22) Filed: Aug. 20, 2007

(65) Prior Publication Data

US 2008/0043341 A1    Feb. 21, 2008

(30) Foreign Application Priority Data

Aug. 21, 2006   (JP)   ............ P 2006-223970

(51) Int. Cl.
G02B 15/14   (2006.01)

(52) U.S. Cl. ................... 359/689; 359/682

(58) Field of Classification Search ........... 359/689, 359/680–682

See application file for complete search history.

(56) References Cited

U.S. PATENT DOCUMENTS

2007/0279759 A1* 12/2007 Hozumi et al. .......... 359/680
2008/0285149 A1* 11/2008 Kurioka et al. .......... 359/689

FOREIGN PATENT DOCUMENTS

| JP | 2003-149556 A | 5/2003 |
| JP | 2006-23678 A | 1/2006 |
| JP | 2006-39523 A | 2/2006 |
| JP | 2006-84829 A | 3/2006 |

OTHER PUBLICATIONS

Chinese Office Action dated May 8, 2009.

* cited by examiner

*Primary Examiner*—Jordan M. Schwartz
(74) *Attorney, Agent, or Firm*—Birch, Stewart, Kolasch & Birch, LLP

(57) ABSTRACT

A zoom lens is provided and includes: in order from an object side thereof, a first lens group having a negative refractive power, a stop; a second lens group having a positive refractive power; and a third lens group having a positive refractive power. The magnification of the zoom lens is varied from a wide angle end to a telephoto end by changing a space between the first lens group and the second lens group and a space between the second lens group and the third lens group. The first lens group includes: in order from an object side thereof, a negative lens having at least one aspherical surface and having a concave surface on an image side thereof; and a positive meniscus lens having a convex surface on the object side thereof. The zoom lens satisfies conditional expressions specified in the specification.

17 Claims, 18 Drawing Sheets

EXAMPLE 1

EXAMPLE 1

EXAMPLE 4

FIG. 5A

| | EXAMPLE 1: BASIC LENS DATA | | | |
|---|---|---|---|---|
| $S_i$ (SURFACE NUMBER) | $R_i$ (RADIUS OF CURVATURE) | $D_i$ (SURFACE-TO-SURFACE SPACING) | $Nd_j$ (REFRACTIVE INDEX) | $\nu d_j$ (ABBE NUMBER) |
| *1 | 999.0949 | 1.00 | 1.80348 | 40.4 |
| *2 | 6.5152 | 1.20 | | |
| 3 | 9.1391 | 2.20 | 2.00069 | 25.5 |
| 4 | 20.566 | D4 (VARIABLE) | | |
| 5 (APERTURE DIAPHRAGM) | — | 0.25 | | |
| 6 | 5.5741 | 3.25 | 1.72916 | 54.7 |
| 7 | -9.1370 | 0.51 | 1.63980 | 34.5 |
| 8 | 4.6687 | 0.19 | | |
| *9 | 4.8197 | 1.00 | 1.56865 | 58.6 |
| *10 | 7.7840 | D10 (VARIABLE) | | |
| *11 | 115.0089 | 1.73 | 1.69098 | 52.9 |
| *12 | -19.1795 | D12 (VARIABLE) | | |
| 13 | ∞ | 0.91 | 1.51680 | 64.2 |
| 14 | ∞ | | | |

(*: ASPHERICAL SURFACE)

10 brackets surfaces *1 through 4
20 brackets surfaces 6 through *10
30 brackets surfaces *11 through *12

FIG. 5B

| | EXAMPLE 1: DATA RELATED TO ZOOMING | | | | | |
|---|---|---|---|---|---|---|
| | FOCAL LENGTH $f$ | FNO. | ANGLE OF VIEW ($2\omega$) | D4 | D10 | D12 |
| WIDE ANGLE END | 8.38 | 2.91 | 63.4 | 15.33 | 6.59 | 5.29 |
| TELEPHOTO END | 23.68 | 5.33 | 23.2 | 2.23 | 21.52 | 3.10 |

FIG. 6

| EXAMPLE 1: ASPHERIC SURFACE DATA ||||
|---|---|---|---|
| ASPHERIC SURFACE COEFFICIENT | SURFACE NUMBER |||
| | FIRST SURFACE | SECOND SURFACE | NINTH SURFACE |
| K | 8.491233E+0 | 2.773683E-1 | -2.983030E-1 |
| A3 | -1.080259E-3 | -1.180956E-3 | -3.052390E-3 |
| A4 | 1.220810E-3 | 1.549467E-3 | 6.272003E-3 |
| A5 | -4.810677E-4 | -5.112136E-4 | -4.510576E-3 |
| A6 | 7.586500E-5 | 4.003801E-5 | 1.664278E-3 |
| A7 | -7.018941E-7 | 1.487466E-5 | 1.895215E-5 |
| A8 | -8.812147E-7 | -2.469155E-6 | -1.863750E-4 |
| A9 | -2.741988E-9 | -4.622533E-8 | -5.610217E-6 |
| A10 | 7.377607E-9 | 5.201855E-9 | 1.361188E-5 |
| A11 | 8.140819E-10 | -8.959601E-9 | 3.256313E-6 |
| A12 | 1.108813E-10 | 3.380012E-9 | -1.515778E-6 |
| A13 | -1.274922E-11 | 8.788580E-11 | — |
| A14 | -3.461394E-12 | -4.304007E-11 | — |
| A15 | -3.295701E-13 | -7.057788E-12 | — |
| A16 | 1.959234E-14 | 8.157601E-13 | — |
| A17 | 3.274328E-15 | -1.298836E-13 | — |
| A18 | 8.733922E-16 | -4.057297E-15 | — |
| A19 | 1.220858E-16 | 7.235203E-15 | — |
| A20 | -2.360039E-17 | -4.949724E-16 | — |
| | TENTH SURFACE | ELEVENTH SURFACE | TWELFTH SURFACE |
| K | 4.914230E+0 | 9.703311E+0 | 1.049999E+1 |
| A3 | -3.806869E-3 | -1.715369E-3 | -1.304748E-3 |
| A4 | 7.710340E-3 | 2.399227E-3 | 3.491940E-3 |
| A5 | -6.158071E-3 | -8.823445E-4 | -2.056990E-3 |
| A6 | 2.424436E-3 | -3.867153E-5 | 6.794330E-4 |
| A7 | -7.199059E-5 | 9.624072E-5 | -1.567322E-4 |
| A8 | -2.079736E-4 | -2.393386E-5 | 2.704882E-5 |
| A9 | -4.926662E-6 | 2.699064E-6 | -2.522496E-6 |
| A10 | 1.213445E-5 | -2.018755E-7 | 8.129179E-9 |
| A11 | 4.201108E-6 | 1.682580E-8 | 9.451658E-9 |
| A12 | -1.522011E-6 | -8.469496E-10 | 3.828676E-10 |

FIG. 7A

| | EXAMPLE 2: BASIC LENS DATA | | | | |
|---|---|---|---|---|---|
| | Si (SURFACE NUMBER) | Ri (RADIUS OF CURVATURE) | Di (SURFACE-TO-SURFACE SPACING) | Ndj (REFRACTIVE INDEX) | νdj (ABBE NUMBER) |
| 10 | *1 | 358.4736 | 1.000 | 1.80348 | 40.4 |
| 10 | *2 | 6.1832 | 1.454 | | |
| 10 | 3 | 9.2999 | 2.187 | 2.00069 | 25.5 |
| 10 | 4 | 21.0218 | D4 (VARIABLE) | | |
| | 5 (APERTURE DIAPHRAGM) | — | 0.250 | | |
| 20 | 6 | 5.4438 | 3.300 | 1.70000 | 48.1 |
| 20 | 7 | −5.4438 | 0.510 | 1.64769 | 33.8 |
| 20 | 8 | 4.5725 | 0.150 | | |
| 20 | *9 | 4.5747 | 1.000 | 1.56865 | 58.6 |
| 20 | *10 | 8.2207 | D10 (VARIABLE) | | |
| 30 | *11 | 37.7354 | 1.630 | 1.69098 | 52.9 |
| 30 | *12 | −33.6552 | D12 (VARIABLE) | | |
| | 13 | ∞ | 1.130 | 1.51680 | 64.2 |
| | 14 | ∞ | | | |

(*: ASPHERICAL SURFACE)

FIG. 7B

| | EXAMPLE 2: DATA RELATED TO ZOOMING | | | | | |
|---|---|---|---|---|---|---|
| | FOCAL LENGTH f | FNO. | ANGLE OF VIEW (2ω) | D4 | D10 | D12 |
| WIDE ANGLE END | 8.04 | 2.90 | 65.6 | 15.21 | 6.90 | 4.82 |
| TELEPHOTO END | 22.70 | 5.28 | 24.0 | 2.17 | 21.53 | 3.00 |

FIG. 8

| EXAMPLE 2: ASPHERIC SURFACE DATA | | | |
|---|---|---|---|
| ASPHERIC SURFACE COEFFICIENT | SURFACE NUMBER | | |
| | FIRST SURFACE | SECOND SURFACE | NINTH SURFACE |
| K | 7.988789E+0 | -8.074420E-2 | -1.396186E+0 |
| A3 | -2.150672E-4 | -7.018180E-4 | -3.357865E-3 |
| A4 | 5.953954E-4 | 1.726834E-3 | 8.583465E-3 |
| A5 | -1.688758E-4 | -7.370747E-4 | -6.377734E-3 |
| A6 | 1.328011E-5 | 2.100231E-4 | 3.499959E-3 |
| A7 | 1.560752E-6 | -2.122507E-5 | -4.744586E-4 |
| A8 | -3.068742E-7 | -3.240192E-6 | -6.693863E-4 |
| A9 | -8.887682E-9 | 5.241453E-7 | 3.499238E-4 |
| A10 | 2.128882E-9 | 7.098156E-8 | -4.154858E-5 |
| A11 | 3.579294E-10 | -1.054934E-8 | -1.042189E-5 |
| A12 | 8.721414E-11 | 2.044475E-9 | 1.976385E-6 |
| A13 | -5.016242E-12 | -1.808538E-10 | — |
| A14 | -2.418889E-12 | -5.869431E-11 | — |
| A15 | -2.845252E-13 | -7.356467E-12 | — |
| A16 | 2.498715E-14 | 1.385097E-12 | — |
| A17 | 1.672149E-15 | 1.168192E-13 | — |
| A18 | 6.800960E-16 | 2.820220E-14 | — |
| A19 | 5.936425E-17 | -3.906962E-16 | — |
| A20 | -1.463282E-17 | -6.834851E-16 | — |
| | TENTH SURFACE | ELEVENTH SURFACE | TWELFTH SURFACE |
| K | 9.006963E+0 | -9.233118E+0 | -9.994489E+0 |
| A3 | -3.997339E-3 | -1.736945E-3 | -3.072829E-3 |
| A4 | 9.085528E-3 | -2.401405E-4 | 2.153011E-3 |
| A5 | -1.121536E-2 | 1.064991E-3 | -8.508407E-4 |
| A6 | 7.363923E-3 | -4.684514E-4 | 3.845010E-4 |
| A7 | -2.052295E-3 | 9.095648E-5 | -1.329521E-4 |
| A8 | -2.719812E-4 | -1.108604E-5 | 2.323770E-5 |
| A9 | 1.946921E-4 | 1.242332E-6 | -1.628426E-6 |
| A10 | 5.847527E-6 | -9.070544E-8 | 1.246577E-8 |
| A11 | -9.129642E-6 | — | — |
| A12 | -6.321805E-7 | — | — |

FIG. 9A

| | EXAMPLE 3: BASIC LENS DATA | | | |
|---|---|---|---|---|
| Si (SURFACE NUMBER) | Ri (RADIUS OF CURVATURE) | Di (SURFACE-TO-SURFACE SPACING) | Ndj (REFRACTIVE INDEX) | νdj (ABBE NUMBER) |
| *1 | 999.9974 | 1.000 | 1.75512 | 45.6 |
| *2 | 6.3430 | 1.218 | | |
| 3 | 9.1400 | 2.136 | 2.00330 | 28.3 |
| 4 | 19.3917 | D4 (VARIABLE) | | |
| 5 (APERTURE DIAPHRAGM) | — | 0.250 | | |
| 6 | 5.6274 | 3.250 | 1.72916 | 54.7 |
| 7 | -9.1013 | 0.586 | 1.6398 | 34.5 |
| 8 | 4.7893 | 0.190 | | |
| *9 | 4.9086 | 1.000 | 1.56865 | 58.6 |
| *10 | 7.6927 | D10 (VARIABLE) | | |
| *11 | 90.8171 | 1.730 | 1.69098 | 52.9 |
| *12 | -18.9905 | D12 (VARIABLE) | | |
| 13 | ∞ | 0.91 | 1.51680 | 64.2 |
| 14 | ∞ | | | |

(*: ASPHERICAL SURFACE)

FIG. 9B

| EXAMPLE 3: DATA RELATED TO ZOOMING | | | | | | |
|---|---|---|---|---|---|---|
| | FOCAL LENGTH f | FNO. | ANGLE OF VIEW (2ω) | D4 | D10 | D12 |
| WIDE ANGLE END | 8.38 | 2.88 | 63.4 | 15.41 | 6.50 | 5.26 |
| TELEPHOTO END | 23.68 | 5.28 | 23.2 | 2.20 | 21.38 | 3.11 |

FIG. 10

| EXAMPLE 3: ASPHERIC SURFACE DATA |||| 
|---|---|---|---|
| ASPHERIC SURFACE COEFFICIENT | SURFACE NUMBER |||
| | FIRST SURFACE | SECOND SURFACE | NINTH SURFACE |
| K | -8.325041E+0 | 3.255320E-2 | -5.172547E-1 |
| A3 | -1.243650E-3 | -1.372480E-3 | -2.848940E-3 |
| A4 | 1.040911E-3 | 1.493754E-3 | 6.129604E-3 |
| A5 | -4.460536E-4 | -4.914308E-4 | -4.480050E-3 |
| A6 | 7.676880E-5 | 4.414174E-5 | 1.694754E-3 |
| A7 | -9.370945E-7 | 1.498856E-5 | 4.427441E-6 |
| A8 | -9.206412E-7 | -2.553851E-6 | -1.909327E-4 |
| A9 | -5.664047E-9 | -5.926902E-8 | -5.263911E-6 |
| A10 | 7.404918E-9 | 3.840178E-9 | 1.432289E-5 |
| A11 | 8.643870E-10 | -8.918139E-9 | 3.374481E-6 |
| A12 | 1.214999E-10 | 3.413956E-9 | -1.568189E-6 |
| A13 | -1.131363E-11 | 9.526876E-11 | — |
| A14 | -3.351031E-12 | -4.239035E-11 | — |
| A15 | -3.296583E-13 | -6.973831E-12 | — |
| A16 | 1.697497E-14 | 8.193192E-13 | — |
| A17 | 2.501347E-15 | -1.309606E-13 | — |
| A18 | 7.802297E-16 | -4.413341E-15 | — |
| A19 | 1.179962E-16 | 7.166622E-15 | — |
| A20 | -2.072268E-17 | -5.046399E-16 | — |
| | TENTH SURFACE | ELEVENTH SURFACE | TWELFTH SURFACE |
| K | 4.327609E+0 | -9.983122E+0 | 1.049999E+1 |
| A3 | -3.533305E-3 | -1.663871E-3 | -1.279101E-3 |
| A4 | 7.352505E-3 | 2.330902E-3 | 3.419010E-3 |
| A5 | -5.986629E-3 | -8.683298E-4 | -2.014192E-3 |
| A6 | 2.422727E-3 | -2.924192E-5 | 6.773008E-4 |
| A7 | -8.962244E-5 | 9.575510E-5 | -1.567977E-4 |
| A8 | -2.111399E-4 | -2.419925E-5 | 2.720458E-5 |
| A9 | -3.804312E-6 | 2.690307E-6 | -2.514904E-6 |
| A10 | 1.296861E-5 | -1.942208E-7 | 2.947415E-9 |
| A11 | 4.411955E-6 | 1.816060E-8 | 8.591625E-9 |
| A12 | -1.617359E-6 | -1.044316E-9 | 6.586456E-10 |

FIG. 11A

| | EXAMPLE 3: BASIC LENS DATA | | | |
|---|---|---|---|---|
| S i (SURFACE NUMBER) | R i (RADIUS OF CURVATURE) | D i (SURFACE-TO-SURFACE SPACING) | Nd j (REFRACTIVE INDEX) | $\nu$ d j (ABBE NUMBER) |
| *1  | 100.0000 | 1.000 | 1.80348 | 40.4 |
| *2  | 6.2542 | 1.528 | | |
| 3   | 9.3353 | 2.001 | 2.00069 | 25.5 |
| 4   | 19.2049 | D4 (VARIABLE) | | |
| 5 (APERTURE DIAPHRAGM) | — | 0.250 | | |
| 6   | 5.5700 | 3.186 | 1.72000 | 46.0 |
| 7   | -6.5992 | 0.534 | 1.66680 | 33.1 |
| 8   | 4.4063 | 0.190 | | |
| *9  | 4.6787 | 1.000 | 1.51760 | 63.5 |
| *10 | 11.6151 | D10 (VARIABLE) | | |
| *11 | 18.3913 | 1.730 | 1.51760 | 63.5 |
| *12 | -199.9421 | 4.717 | | |
| 13  | ∞ | 0.91 | 1.51680 | 64.2 |
| 14  | ∞ | | | |

(*: ASPHERICAL SURFACE)

FIG. 11B

| | EXAMPLE 3: DATA RELATED TO ZOOMING | | | | |
|---|---|---|---|---|---|
| | FOCAL LENGTH f | FNO. | ANGLE OF VIEW (2$\omega$) | D4 | D10 |
| WIDE ANGLE END | 7.95 | 2.89 | 66.2 | 17.74 | 7.34 |
| TELEPHOTO END | 22.46 | 4.96 | 24.4 | 2.18 | 20.12 |

FIG. 12

| EXAMPLE 4: ASPHERIC SURFACE DATA ||||
|---|---|---|---|
| ASPHERIC SURFACE COEFFICIENT | SURFACE NUMBER |||
| | FIRST SURFACE | SECOND SURFACE | NINTH SURFACE |
| K | -9.533059E+0 | 6.613569E-1 | 9.152795E-1 |
| A3 | -1.002792E-3 | -1.478050E-3 | -3.904235E-3 |
| A4 | 1.492745E-3 | 2.113700E-3 | 6.987800E-3 |
| A5 | -5.468164E-4 | -8.496906E-4 | -6.248170E-3 |
| A6 | 7.421819E-5 | 1.082274E-4 | 2.095423E-3 |
| A7 | 1.069564E-6 | 1.201922E-5 | 1.654463E-4 |
| A8 | -8.495048E-7 | -3.531256E-6 | -2.126627E-4 |
| A9 | -2.305831E-8 | -3.728858E-8 | -3.248306E-5 |
| A10 | 4.228299E-9 | 2.162515E-8 | 1.345362E-5 |
| A11 | 6.604794E-10 | -6.365391E-9 | 7.529691E-6 |
| A12 | 1.376975E-10 | 3.407206E-9 | -2.362246E-6 |
| A13 | -4.893238E-12 | 2.439848E-11 | — |
| A14 | -2.478385E-12 | -5.711139E-11 | — |
| A15 | -2.668421E-13 | -8.705399E-12 | — |
| A16 | 1.250851E-14 | 8.956288E-13 | — |
| A17 | 6.411772E-16 | -6.058986E-14 | — |
| A18 | 4.357148E-16 | 1.187340E-14 | — |
| A19 | 9.858655E-17 | 8.472388E-15 | — |
| A20 | -1.365664E-17 | -1.108085E-15 | — |
| | TENTH SURFACE | ELEVENTH SURFACE | TWELFTH SURFACE |
| K | 9.999616E+0 | 2.452067E+0 | 1.047283E+1 |
| A3 | -3.935179E-3 | -5.723058E-3 | -8.625043E-3 |
| A4 | 8.147584E-3 | 2.460537E-3 | 6.640312E-3 |
| A5 | -5.803982E-3 | -1.949397E-4 | -2.941302E-3 |
| A6 | 2.082293E-3 | -2.241697E-4 | 8.217003E-4 |
| A7 | -1.639108E-4 | 9.485734E-5 | -1.642918E-4 |
| A8 | -1.000647E-4 | -2.146090E-5 | 2.386715E-5 |
| A9 | 3.592003E-5 | 2.971121E-6 | -2.531170E-6 |
| A10 | -1.287156E-6 | -2.133953E-7 | 1.080694E-7 |
| A11 | -7.880633E-6 | 9.562097E-9 | 2.394834E-8 |
| A12 | 1.947212E-6 | -7.791199E-10 | -3.094011E-9 |

FIG. 13

| VALUES RELATED TO CONDITIONAL EXPRESSIONS | | | | |
|---|---|---|---|---|
| | EXAMPLE 1 | EXAMPLE 2 | EXAMPLE 3 | EXAMPLE 4 |
| N2 | 2.00069 | 2.00069 | 2.00330 | 2.00069 |
| $Da/|f1|$ | 0.23 | 0.26 | 0.22 | 0.25 |
| $|f1|/fw$ | 2.27 | 2.20 | 2.32 | 2.30 |
| N1 | 1.80348 | 1.80348 | 1.75512 | 1.80348 |
| $\nu 1-\nu 2$ | 14.9 | 14.9 | 17.3 | 14.9 |

EXAMPLE 1 (WIDE ANGLE END)

EXAMPLE 1 (TELEPHOTO END)

EXAMPLE 2 (WIDE ANGLE END)

EXAMPLE 2 (TELEPHOTO END)

EXAMPLE 3 (WIDE ANGLE END)

EXAMPLE 3 (TELEPHOTO END)

ZOOM LENS AND IMAGING APPARATUS

BACKGROUND OF THE INVENTION

1. Field of the Invention

The present invention relates to a small zoom lens and an imaging apparatus which are preferably used for a video camera, a digital still camera and the like.

2. Description of Related Art

As a zoom lens for use in a video camera, a digital still camera and the like, for example, known is a three-group zoom lens in which the magnification is varied by moving lens groups along an optical axis so as to change spaces between the respective lens groups. In recent years, in imaging optical systems like this, there has been an increasing demand for optical systems which are smaller in size and are able to form images with higher quality. JP-A-2003-149556, JP-A-2006-39523, JP-A-2006-84829 and JP-A-2006-23678 propose techniques in which the whole optical system of a three-group zoom lens is made smaller in size while being configured to form images with higher quality by arranging refractive powers of the lens groups in a negative-positive-positive configuration and making effective use of aspherical surfaces and cemented lenses.

Here, in the three-group zoom lens, in order to attain the miniaturization, a reduction in maximum length of the lens when in use and a reduction in overall thickness of each lens group are necessary. In addition, in order to attain the formation of images with higher quality, spherical aberration, field curvature and chromatic aberration need to be corrected. In the zoom lenses described in the patent publications above, however, since the focal length of the whole of a first lens group is made longer or the thickness of the whole of the first lens group is made thicker, the overall length of the zoom lens tends to be long, and the miniaturization has not yet been attained sufficiently. In addition, in the event that a further miniaturization is attempted to attained based on the configuration of the zoom lens described in each of the aforesaid patent documents, the formation of images with higher quality cannot be realized.

In addition, in JP-A-2003-149556, since a surface of the second lens group which lies closest to the object is made aspherical and this aspherical lens is made to constitute a cemented lens, the aspherical surface cannot be provided only on one surface, leading to an issue that among aberrations, in particular, spherical aberration cannot be corrected sufficiently. In addition, in the configuration of JP-A-2006-39523, since a second lens group is made up of a cemented lens which is made up by cementing three lenses together, the degree of freedom in design is reduced, and the correction of, in particular, spherical aberration is made difficult. In addition, in the configuration of JP-A-2006-84829, since the focal length of a second lens group which constitutes a primary variable power or focal length varying portion is long, the overall length of the zoom lens becomes long, whereby the miniaturization is made difficult to be realized. In addition, in the configuration of JP-A-2006-23678, since a second lens group is made up of two lenses; a positive lens and a negative lens, the correction of on-axis chromatic aberration is made difficult. Consequently, the realization of a zoom lens system has long been desired which is smaller in size and is able to form images with higher quality, compared to the three-group zoom lenses according to the related art.

SUMMARY OF THE INVENTION

An object of an illustrative, non-limiting embodiment of the invention is to provide a zoom lens and an imaging apparatus, which can preferably be used for a video camera, a digital still camera and the like.

According to an aspect of the invention, there is provided a zoom lens including, in order from an object side thereof, a first lens group having a negative refractive power, a stop, a second lens group having a positive refractive power and a third lens group having a positive refractive power. An space between the first lens group and the second lens group and an space between the second lens group and the third lens group are changed to vary the magnification from a wide angle end to a telephoto end. In addition, the first lens group is configured to include: in order from the object side thereof, a negative lens having at least one aspherical surface and having a concave surface on the image side thereof; and a positive meniscus lens having a convex surface on the object side thereof. Furthermore, the zoom lens is configured so as to satisfy the following conditional expressions, in which N2 is a refractive index of the positive meniscus lens of the first lens group at the d-line, Da is a distance along the optical axis between an object side apex of the negative lens and an image side apex of the positive meniscus lens of the first lens group, f1 is a focal length of the first lens group, and fw is a focal length of the whole zoom lens system at the wide angle end:

$$N2 > 1.95 \tag{1}$$

$$0.2 < Da/|f1| < 0.3 \tag{2}$$

$$2.0 < |f1|/fw < 3.0. \tag{3}$$

A imaging apparatus according to an aspect of the invention is such as to include the zoom lens which is configured as has been described above.

In the zoom lens and the imaging apparatus according to an aspect of the invention, the space between the first lens group and the second lens group and the space between the second lens group and the third lens group are changed so as to vary the magnification. In this zoom lens, the first lens group is made up of the two lenses including: the negative lens having the at least one aspherical surface and having the concave surface on the image side; and the positive meniscus lens having the convex surface on the object side, and the conditional expressions are satisfied with respect to the configuration of the first lens group, whereby the overall configuration of the first lens group is optimized, and the overall thickness of the first lens group is made thinner and the focal length of the same lens group is made shorter while suppressing the aberrations. Thus, this configuration becomes advantageous in decreasing the overall length of the zoom lens while suppressing the aberrations.

In addition, by adopting and satisfying the following conditions appropriately, the zoom lens according to an aspect of the invention becomes easier to be miniaturized and can hold images with higher quality.

The zoom lens according to an aspect the invention preferably satisfy the following conditional expressions, in which N1 is a refractive index of the negative lens of the first lens group at the d-line, v1 is an Abbe number of the negative lens of the first lens group at the d-line, and v2 is an Abbe number of the positive meniscus lens of the first lens group at the d-line:

$$N1 > 1.75 \tag{4}$$

$$10 < v1 - v2 < 19 \tag{5}$$

The zoom lens according to an aspect of the invention preferably satisfies the following conditional expression, whereby the zoom lens becomes more advantageous in decreasing the overall length of the zoom lens.

$$2.0 < |fl|/fw < 2.4 \tag{6}$$

In the zoom lens according to an aspect of the invention, in addition, the second lens group preferably has a two-group, three-lens configuration which consists of: in order from the object side, a cemented lens consisting of a double convex lens and a negative lens having a concave surface on the object side; and a positive single lens having at least one aspherical surface. By this configuration, the zoom lens becomes more advantageous in correction of the aberrations, whereby images with much higher quality can be held.

Furthermore, a shape of the aspherical surface of the first lens group is preferably defined by an aspheric coefficient which includes a coefficient in an odd-order term. In addition, the shape of the aspherical surface of the first lens group is preferably defined by an aspheric coefficient which includes a coefficient in a 16-th or more order term. By these configurations, the resulting zoom lens becomes more advantageous in correction of the aberrations, whereby images with much higher quality can be held.

BRIEF DESCRIPTION OF THE DRAWINGS

The features of the invention will appear more fully upon consideration of the exemplary embodiment of the invention, which are schematically set forth in the drawings, in which:

FIG. 5 is tables showing lens data of the zoom lens according to Example 1, in which (A) shows lens data and (B) shows data related to zooming;

FIG. 6 is a table showing data related to aspherical surfaces of the zoom lens according to Example 1;

FIG. 7 is tables showing lens data of the zoom lens according to Example 2, in which (A) shows lens data and (B) shows data related to zooming;

FIG. 8 is a table showing data related to aspherical surfaces of the zoom lens according to Example 2;

FIG. 9 is tables showing lens data of the zoom lens according to Example 3, in which (A) shows lens data and (B) shows data related to zooming;

FIG. 10 is a table showing data related to aspherical surfaces of the zoom lens according to Example 3;

FIG. 11 is tables showing lens data of the zoom lens according to Example 4, in which (A) shows lens data and (B) shows data related to zooming;

FIG. 12 is a table showing data related to aspherical surfaces of the zoom lens according to Example 4;

FIG. 13 is a table showing values of conditional expressions which are grouped into the respective examples;

DETAILED DESCRIPTION OF THE EXEMPLARY EMBODIMENTS

Figure 1:
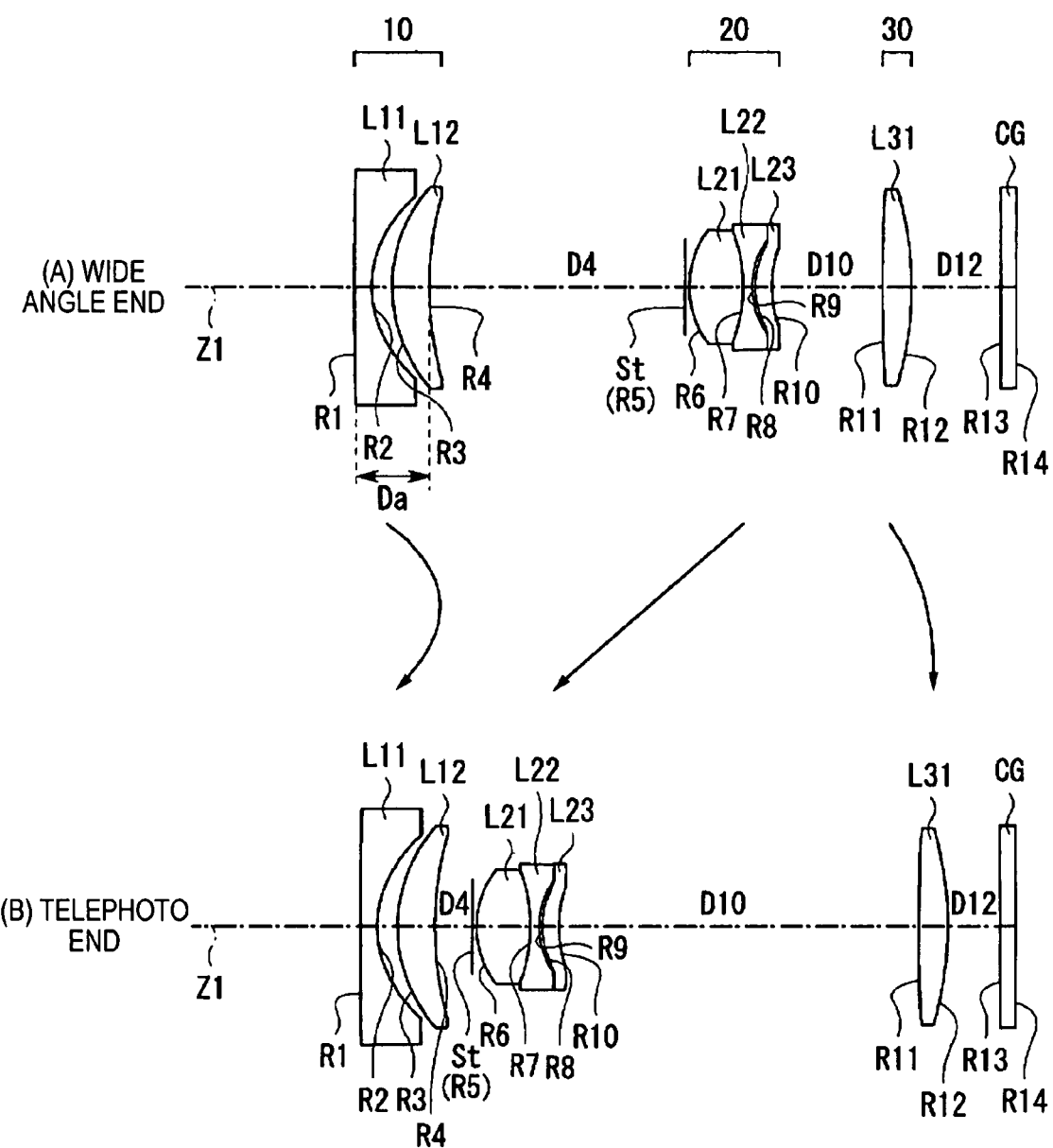
FIG. 1 is a sectional view of a zoom lens according to an exemplary embodiment of the invention which shows a first configuration example thereof which corresponds to Example 1.

Although the invention will be described below with reference to exemplary embodiments thereof, the following exemplary embodiments and modifications do not restrict the invention.

According to a zoom lens or an imaging apparatus of an exemplary embodiment of the invention, in the three-group zoom lens, since in particular, the overall thickness and focal length of the first lens group are configured to be decreased by optimizing the overall configuration of the first lens group while suppressing the aberrations, the overall length of the zoom lens can be decreased while suppressing the aberrations, thereby making it possible to realize the imaging system which is small in size and is able to form images with higher quality, so as to be preferably used for video cameras, digital still cameras and the like.

Hereinafter, referring to the drawings, exemplary embodiments of the invention will be described in detail.

Figure 2:
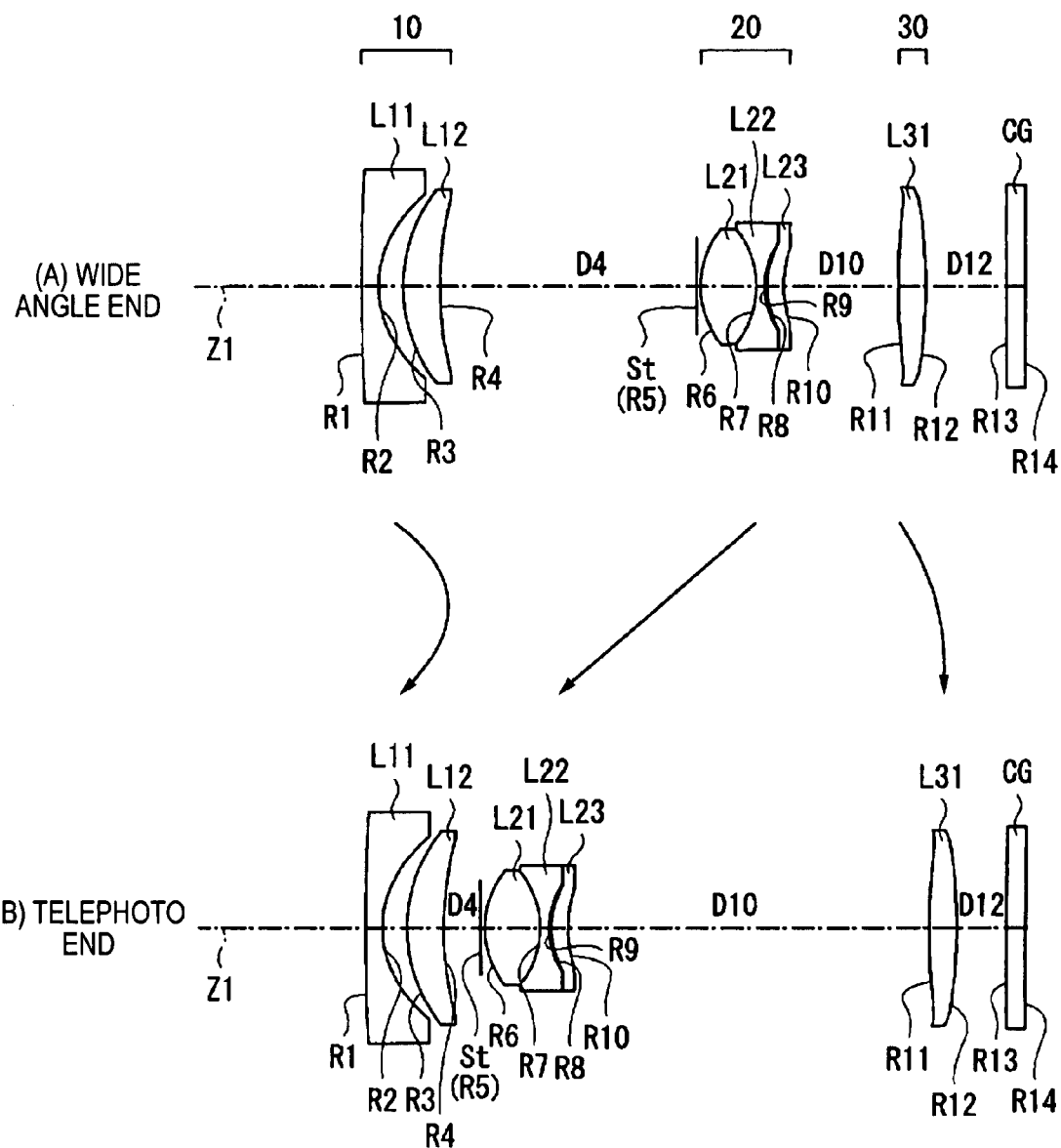
FIG. 2 is a sectional view of the zoom lens according to an exemplary embodiment of the invention which shows a second configuration example thereof which corresponds to Example 2.
Figure 3:
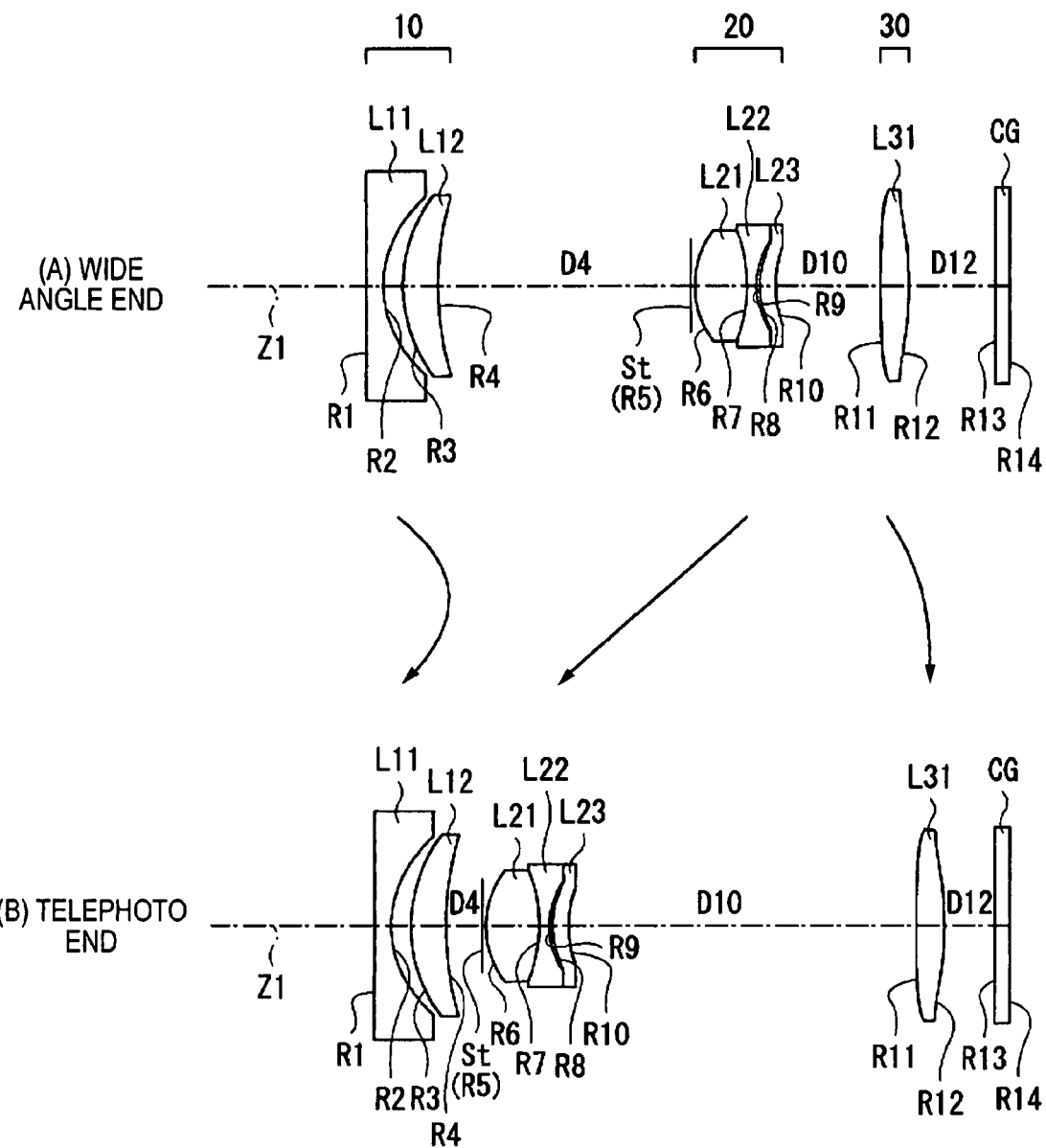
FIG. 3 is a sectional view of a zoom lens according to an exemplary embodiment of the invention which shows a third configuration example thereof which corresponds to Example 3.
Figure 4:
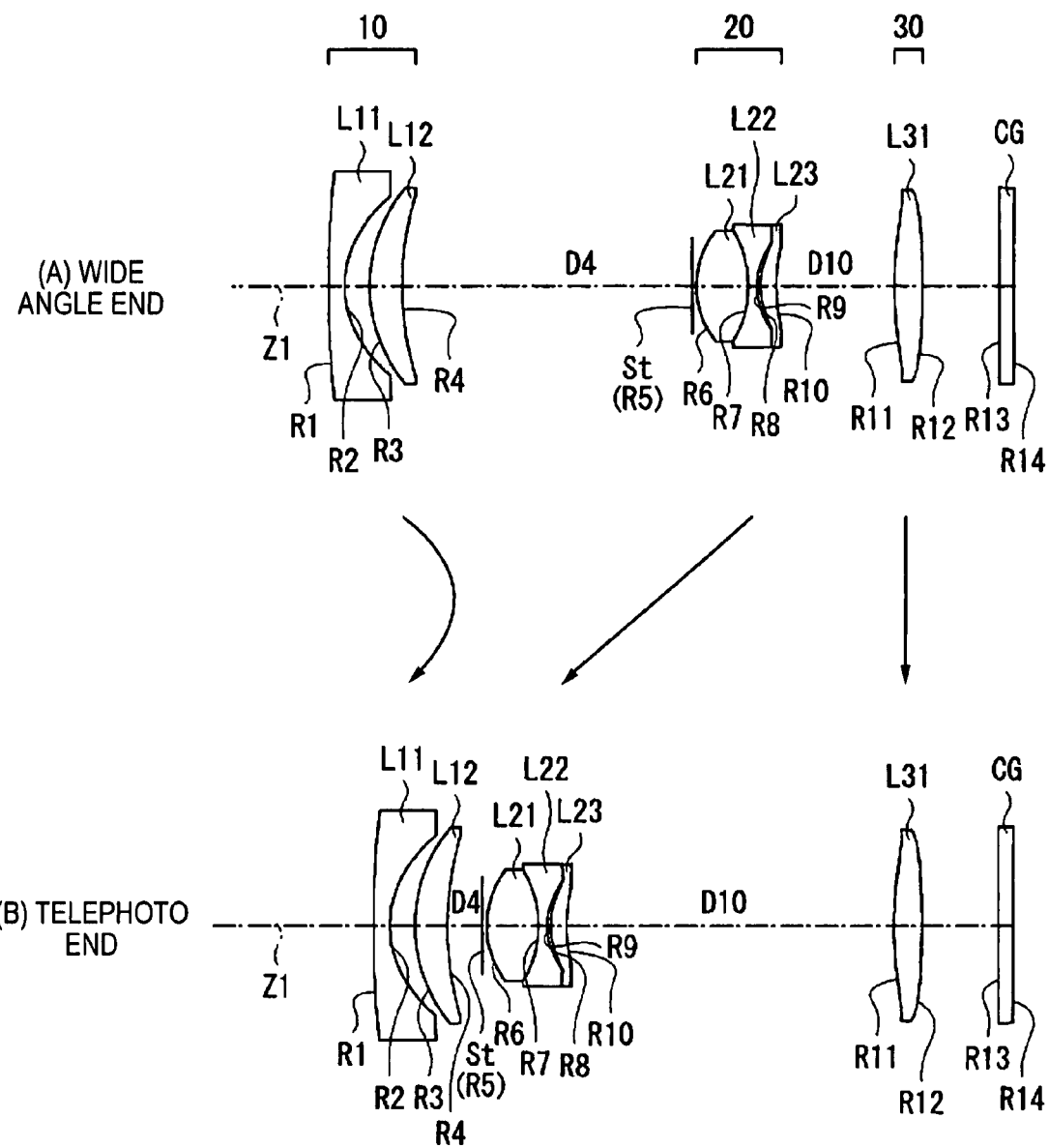
FIG. 4 is a sectional view of the zoom lens according to an exemplary embodiment of the invention which shows a fourth configuration example thereof which corresponds to Example 4.
Figure 14:
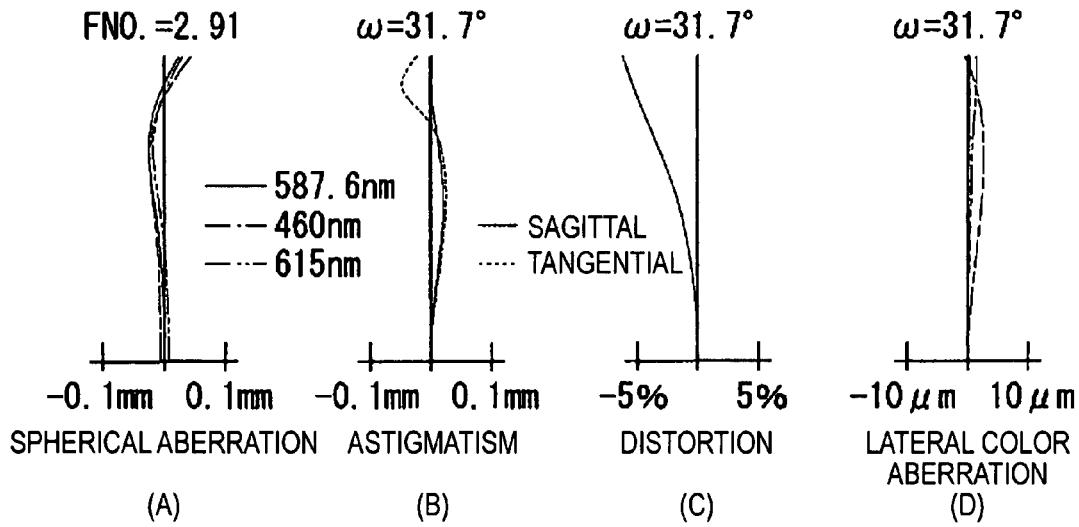
FIG. 14 is aberration diagrams showing aberrations at the wide angle end of the zoom lens according to Example 1, in which (A) shows spherical aberration, (B) shows astigmatism, (C) shows distortion, and (D) shows lateral color aberration.
Figure 15:
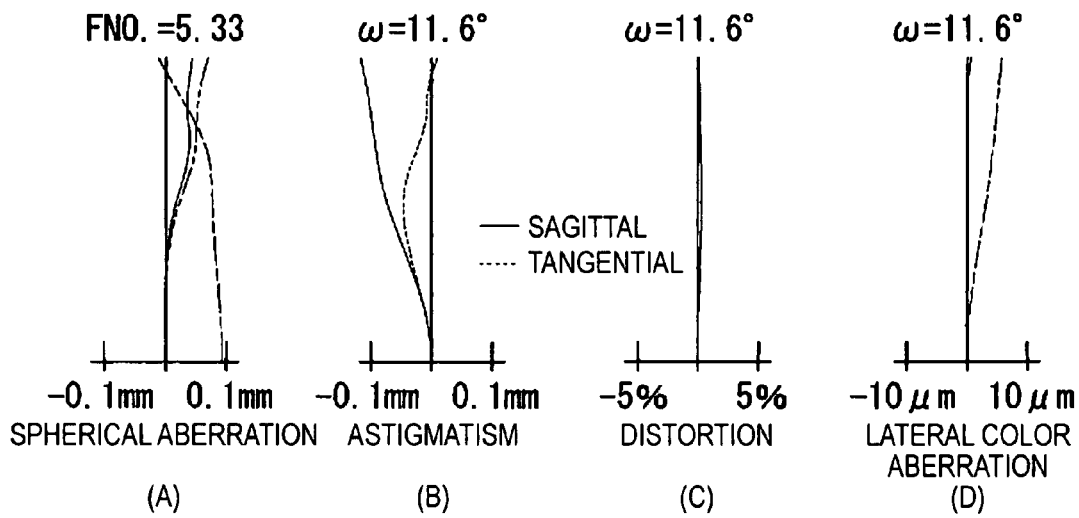
FIG. 15 is aberration diagrams showing aberrations at the telephoto end of the zoom lens according to Example 1, in which (A) shows spherical aberration, (B) shows astigmatism, (C) shows distortion, and (D) shows lateral color aberration.
Figure 16:
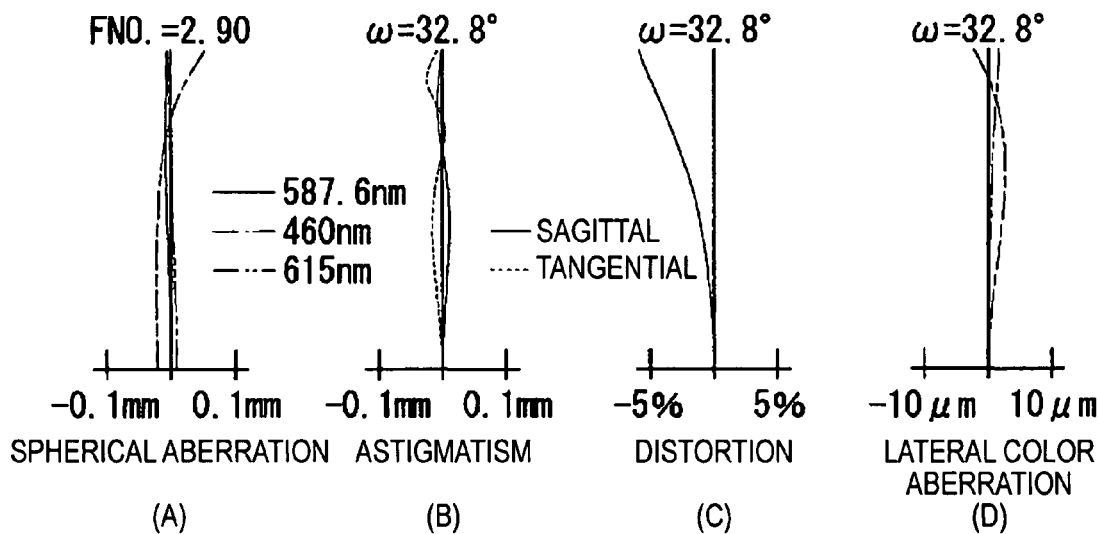
FIG. 16 is aberration diagrams showing aberrations at the wide angle end of the zoom lens according to Example 2, in which (A) shows spherical aberration, (B) shows astigmatism, (C) shows distortion, and (D) shows lateral color aberration.
Figure 17:
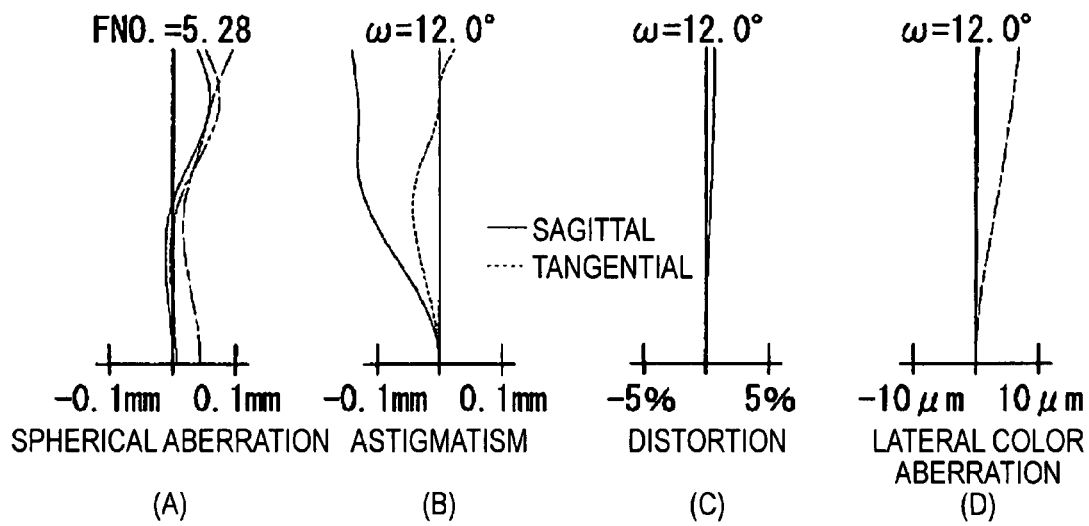
FIG. 17 is aberration diagrams showing aberrations at the telephoto end of the zoom lens according to Example 2, in which (A) shows spherical aberration, (B) shows astigmatism, (C) shows distortion, and (D) shows lateral color aberration.
Figure 18:
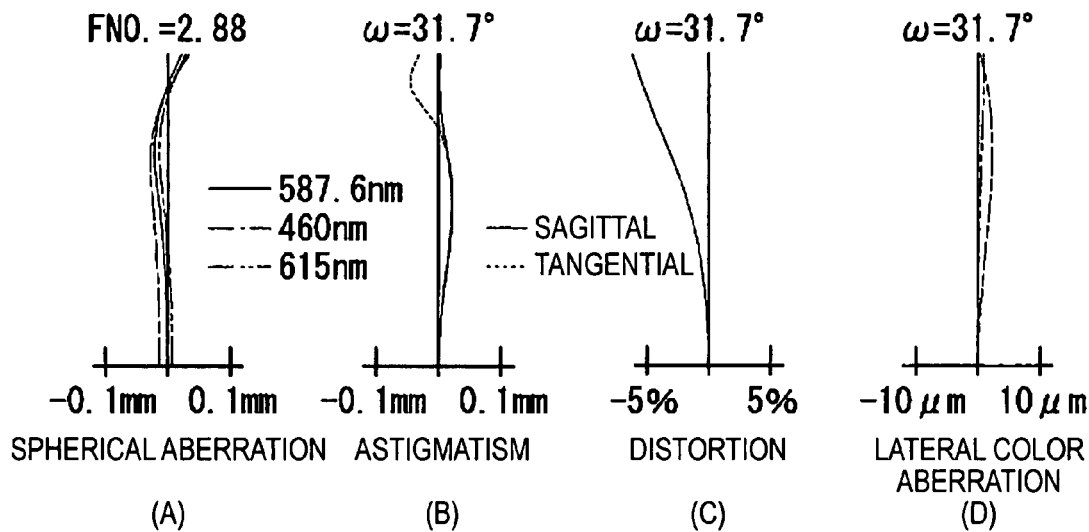
FIG. 18 is aberration diagrams showing aberrations at the wide angle end of the zoom lens according to Example 3, in which (A) shows spherical aberration, (B) shows astigmatism, (C) shows distortion, and (D) shows lateral color aberration.
Figure 19:
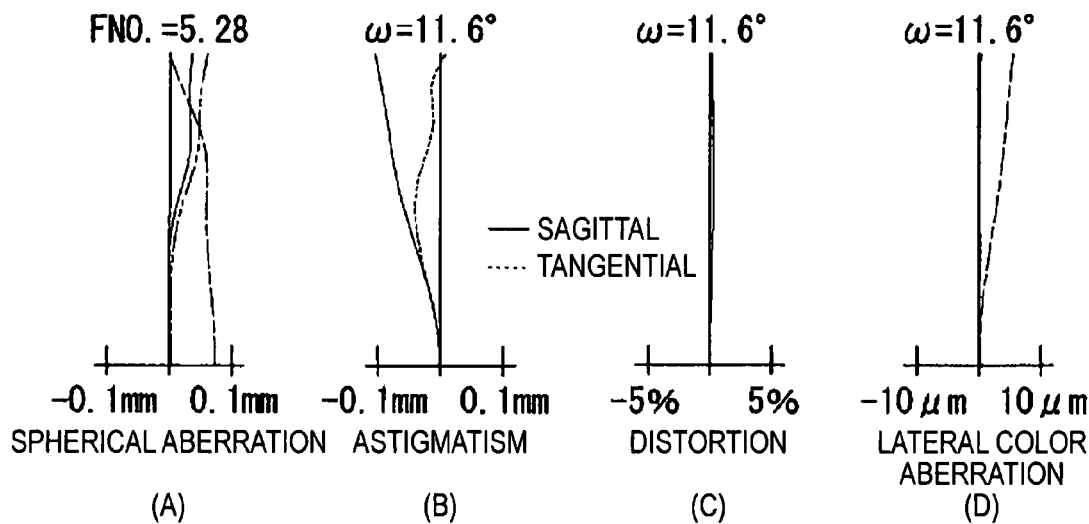
FIG. 19 is aberration diagrams showing aberrations at the telephoto end of the zoom lens according to Example 3, in which (A) shows spherical aberration, (B) shows astigmatism, (C) shows distortion, and (D) shows lateral color aberration.
Figure 20:
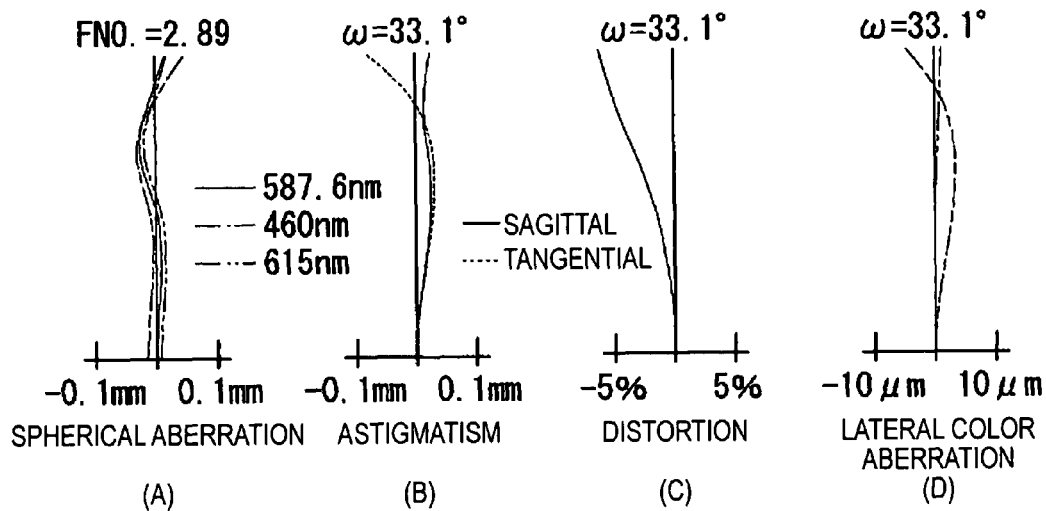
FIG. 20 is aberration diagrams showing aberrations at the wide angle end of the zoom lens according to Example 4, in which (A) shows spherical aberration, (B) shows astigmatism, (C) shows distortion, and (D) shows lateral color aberration.
Figure 21:
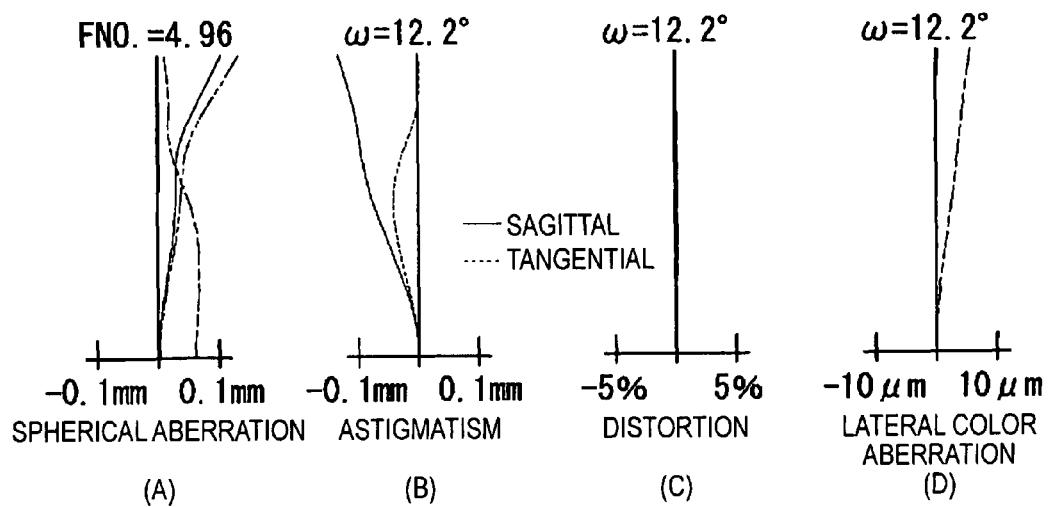
FIG. 21 is aberration diagrams showing aberrations at the telephoto end of the zoom lens according to Example 4, in which (A) shows spherical aberration, (B) shows astigmatism, (C) shows distortion, and (D) shows lateral color aberration.

FIGS. 1(A), 1(B) show a first configuration example of a zoom lens according to an exemplary embodiment of the invention. This configuration example corresponds to a lens configuration of a first numerical example (FIGS. 5(A), 5(B), FIG. 6), which will be described later on. FIGS. 2(A), 2(B) show a second configuration example, which corresponds to a lens configuration of a second numerical example (FIGS. 7(A), 7(B), FIG. 8), which will be described later on. FIGS. 3(A), 3(B) show a third configuration example, which corresponds to a lens configuration of a third numerical example (FIGS. 9(A), 9(B), FIG. 10), which will be described later on. FIGS. 4(A), 4(B) show a fourth configuration example, which corresponds to a fourth numerical example (FIGS. 11(A), 11(B), FIG. 12), which will be described later on. In FIGS. 1(A), 1(B) to 4(A), 4(B), reference character Ri denotes a radius of curvature of an i-th surface when symbols are given to surfaces of constituent lenses of the zoom lens in such a manner as to increase sequentially from an object side surface of a constituent lens situated closest to an object as the first surface, toward an image side (or an image forming side) of the zoom lens. Reference character Di denotes a space on an optical axis Z1 between the i-th surface and an i+1-th surface. Reference character Di is given to spaces which are caused to vary in association with power variation, and in FIGS. 1 to 3, D4, D10, D12 are given, while in FIG. 4, D4, D10 are given. Note that the configuration examples raised above have basically the same configuration, and therefore, the first configuration example shown in FIG. 1 will be described below as representing the others, while the configuration examples shown in FIGS. 2 to 4 will be described as required.

This zoom lens is such as to be used preferably for digital still cameras, mobile phones with a camera, video cameras and the like. This zoom lens includes: in order from the object side thereof along the optical axis Z1, a first lens group 10 having a negative refractive power; a stop St; a second lens group 20 having a positive refractive power which is disposed right behind the stop St; and a third lens group 30 having a positive refractive power. In addition, an image sensing device such as a CCD (Charge Coupled Device) or a CMOS (Complementary Metal Oxide Semiconductor), not shown, is disposed at an image forming surface. A flat plate-like optical member CG such as an image sensing surface protection cover glass or an infrared ray cut-off filter is disposed between the third lens group 30 and the image sensing device depending upon the configuration of a camera to which the zoom lens is attached.

In this zoom lens, varying the magnification from the wide angle end to the telephoto end is implemented by changing an space between the first lens group 10 and the second lens group 20 and an space between the second lens group 20 and the third lens group 30. As this occurs, the first lens group 10, second lens group 20 and third lens group 30 move in such a manner as to draw loci indicated by solid lines in FIGS. 1(A), 1(B), which show positions of the lens groups at the wide angle end and the telephoto end, respectively.

The first lens group 10 has a two-lens configuration which includes: in order from the object side, a negative lens L11 having a concave surface on the image side; and a positive meniscus lens L12 having a convex surface on the object side. At least one surface of the negative lens L11 is made into an aspherical shape. In addition, the negative lens L11 is preferably a meniscus lens of which the image side surface is made deeply concave toward the image. However, the negative lens may be made up of a plano-concave lens or a double concave lens. In addition, the positive meniscus lens L12 is preferably configured such that the object side convex surface is made deeply convex toward the object.

In addition, the first lens group 10 satisfies the following conditional expressions. However, N2 denotes a refractive index of the positive meniscus lens L12 of the first lens group 10 at the d-line, Da denotes a distance along the optical axis Z1 between an object side apex of the negative lens L11 and an image side apex of the positive meniscus lens L12 of the first lens group 10 (refer to FIG. 1(A)), f1 denotes a focal length of the first lens group 10, and fw a focal length of a whole system at the wide angle end:

$$N2 > 1.95 \quad (1)$$

$$0.2 < Da/|f1| < 0.3 \quad (2)$$

$$2.0 < |f1|/fw < 3.0 \quad (3).$$

The conditional expression (2) is preferably the following conditional expression:

$$0.21 < Da/|f1| < 0.28.$$

Furthermore, the first lens group 10 preferably satisfies the following conditional expressions, in which N1 is a refractive index of the negative lens L11 of the first lens group 10 at the d-line, ν1 is an Abbe number of the negative lens L11 of the first lens group 10 at the d-line, and ν2 is an Abbe number of the positive meniscus lens L12 of the first lens group 10 at the d-line:

$$N1 > 1.75 \quad (4)$$

$$10 < \nu1 - \nu2 < 19 \quad (5).$$

The conditional expression (5) is preferably the following condition expression:

$$11.0 < \nu1 - \nu2 < 18.5.$$

The zoom lens according preferably satisfies the following conditional expression:

$$2.0 < |f1|/fw < 2.4 \quad (6).$$

The second lens group 20 preferably has a two-group, three-lens configuration which consists of: in order from the object side, a cemented lens consisting of a double convex lens L21 and a negative lens L22 having a concave surface on the object side; and a positive single lens L23, and at least one of surfaces of the single lens L23 is made into an aspherical surface.

The third lens group 30 includes a positive lens L31 is made convex on both sides in the vicinity of the optical axis. When the magnification is varied from the wide angle end to the telephoto end, the third lens group 30 is configured to move toward the image side. In the configuration example shown in FIG. 4, however, the third lens group 30 is configured as a fixed lens group.

Figure 22:
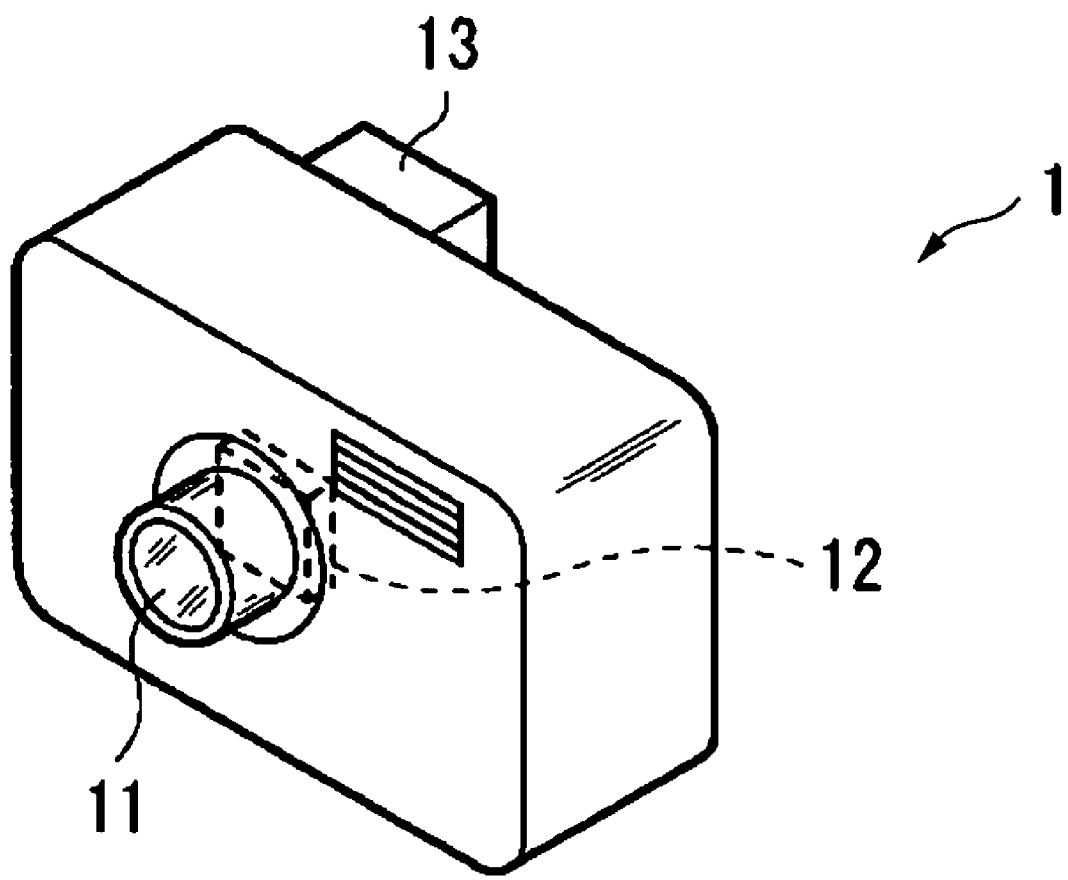
FIG. 22 is a perspective view showing an exemplary embodiment of an imaging apparatus on which the zoom lens according to an exemplary embodiment of the invention is installed.

FIG. 22 is a perspective view showing the configuration of an imaging apparatus 1 according to an exemplary embodiment of the invention. The imaging apparatus 1 includes, for example, an imaging optical system 11 on a front surface of a main body case which is formed into a rectangular parallelepiped shape and has an image sensing device 12 in an interior of the case. In addition, for example, a viewfinder optical system 13 is provided on a rear surface of the main body case. A zoom lens such that is configured as is described above is preferably used as the imaging optical system 11.

A function and advantage of the zoom lens that is configured as has been described heretofore will be described below.

In this zoom lens, the magnification is varied by changing the space between the first lens group 10 and the second lens group 20 and the space between the second lens group 20 and the third lens group 30. Here, as to imaging optical systems such as digital cameras, there has been an increasing demand for miniaturization of the whole optical system and formation images with higher quality. In this case, in order to attain the miniaturization, it is inevitable to decrease a maximum overall length of the zoom lens when in use and to decrease a total thickness of each lens group. Further, in order to form images with higher quality, it is inevitable to make corrections of spherical aberration, field curvature and chromatic aberration. To make this happen, in this zoom lens, the first lens group 10 includes: the negative lens L11 having at least one aspherical surface and having the concave surface on the image side; and the positive meniscus lens L12 having a convex surface on the object side, so that the correction of field curvature and chromatic aberration is enabled with a small number of lenses. In addition, by satisfying the conditional expressions related to the configuration of the first lens group 10, the configuration of the first lens group 10 is optimized. Specifically speaking, in particular, a decrease in thickness and focal length of the first lens group 10 is realized, while suppressing the aberrations, so as to realize a decrease in overall length of the zoom lens. In particular, by satisfying the conditional expressions (2), (3), the decrease in overall thickness and focal length of the first lens group 10 is realized, and in order to ease the decrease in overall thickness of the first lens group 10, a material for each lens within the first lens group 10 is optimized by satisfying the conditional expressions (1), (4), (5), whereby the miniaturization of the zoom lens and the formation of images with higher quality are realized simultaneously. Hereinafter, the function and advantage of each of the conditional expressions will be described in greater detail.

The conditional expression (1) relates to the refractive index N2 of the positive meniscus lens L12 of the first lens group 10 at the d-line. The conditional expression (4) relates to the refractive index N1 of the negative lens L11 of the first lens group 10 at the d-line. These conditional expressions (1), (4) contribute to correction of the thickness of each lens within the first lens group 10 and field curvature of the zoom lens. In the first lens group 10, by using the lenses made of a material having a high refractive index which satisfies the conditional expressions (1), (4), the radius of curvature of each lens surface can be extended relative to refractive power. In particular, by satisfying the conditional expressions (1) and (4) simultaneously, the Petzval sum of the first lens group can made appropriate, and therefore, field curvature is corrected properly. In the event that the value of the conditional expression (1) falls below the lower limit, the radius of curvature of the positive lens L12 becomes short, whereby the overall thickness of the first lens group 10 is unfavorably increased, and hence, falling below the lower limit is not preferable. Similarly, in the event that the value of the conditional expression (4) falls below the lower limit, the radius of curvature of the negative lens becomes short, whereby the overall thickness of the first lens group is unfavorably increased, and hence, falling below the lower limit is not preferable.

The conditional expression (2) is such as to specify the relationship between a value Da which indicates the total thickness of the first lens group 10 and the focal length fl of the first lens group 10. By satisfying the conditional expression (2), the thickness of the first lens group 10 can be decreased within a range where a lens barrel frame or the like can be designed. In the event that the value of the conditional expression (2) falls below the lower limit, the thickness of the first lens group 10 is decreased. However, in conjunction this, the space between the negative lens L11 and the positive lens L12 becomes too narrow, whereby it becomes difficult to design a lens barrel therefor, and hence, falling below the lower limit is not preferable. On the other hand, in the event that the upper limit of the conditional expression (2) is surpassed, the overall thickness of the first lens group 10 is increased, and a lens outside diameter of the negative lens L11 is expanded. These tendencies are disadvantageous in attaining the miniaturization, and hence, surpassing the upper limit is not preferable.

The conditional expressions (3) and (6) are such as to specify the relationship between the focal length fl of the first lens group 10 and the focal length fw of the whole system at the wide angle end. By satisfying the conditional expression (3), the refractive power of the first lens group 10 is strengthened so as to decrease a change in aberration when the magnification is varied, while realizing a decrease in thickness of the first lens group 10. In the event that the value of the conditional expression (3) falls below the lower limit, the overall length of the zoom lens is decreased. However, the refractive power of the first lens group 10 becomes too strong to thereby increase the aberration change when the magnification is varied. Thus, falling below the lower limit is not preferable. On the other hand, in the event that the upper limit of the conditional expression (3) is surpassed, the change in aberration when the magnification is varied is decreased. However, the refractive power of the first lens group 10 becomes too weak, whereby the length of the zoom lens is increased. Thus, surpassing the upper limit is not preferable. In addition, to be more preferable, by satisfying the conditional expression (6), the overall thickness of the first lens group 10 is decreased, which is advantageous in attaining the miniaturization.

The conditional expression (5) is such as to specify the relationship between the Abbe number ν1 of the negative lens L11 at the d-line and the Abbe number ν2 of the positive meniscus lens L12 at the d-line of the first lens group 10. When the space between the lenses is narrowed in order to decrease the thickness of the first lens group 10, there is no difference in height from the optical axis between off-axis light rays on surfaces of the respective lenses, whereby lateral color aberration is increased so much that the correction thereof becomes difficult. By optimizing the Abbe numbers of the respective lenses so as to satisfy the conditional expression (5), however, the lateral color aberration can be corrected properly while narrowing the space between the lenses of the first lens group 10 within the range where the lens barrel frame can be designed. In the event that the value of the conditional expression (5) falls below the lower limit, the space between the lenses needs to be narrowed more in order to correct the lateral color. However, it becomes difficult to narrow the space more due to the configuration of the lens barrel frame, and hence, falling below the lower limit is not preferable. On the contrary, in the event that the upper limit of the conditional expression (5) is surpassed, the space between the lenses needs to be expanded in order to correct the lateral color, which increased the overall thickness of the first lens group 10, and therefore, surpassing the upper limit is not preferable.

In addition, in this zoom lens, on-axis chromatic aberration is decreased by adopting in the second lens group 20 the two-group, three-lens configuration in which the second lens group 20 consists of: the cemented lens which consists of, in turn, of the double convex lens L21 and the negative lens L22; and the single lens L23. Furthermore, the refractive power of the single lens L23 is made to be positive, and at least one of the surfaces of the single lens L23 is made into the aspherical surface, where spherical aberration can be corrected properly.

Furthermore, in this zoom lens, at least one of the surfaces of the negative lens L11 of the first lens group 10 is made into the aspherical surface, and the shape of this aspherical surface is made to be defined by a coefficient which includes a coefficient in an odd-order term or a coefficient in a 16-th or more order term, whereby spherical aberration, field curvature and distortion are corrected simultaneously and properly. Since the difference in height from the optical axis between on-axis light rays and off-axis light rays is relatively large in the negative lens, the aforesaid correction is implemented effectively.

In addition, in this zoom lens, when varying the magnification from the wide angle end to the telephoto end, the third lens group 30 may be made to be moved or fixed depending on a mode to be used. For example, the overall length of the zoom lens when in use can be decreased by implementing the varying of the magnification by moving the third lens group 30 toward the image side. Alternatively, changes in FNO and exit pupil distance when the magnification is varied can be decreased by configuring the third lens group 30 to be fixed.

As has been described heretofore, according to the zoom lens of this embodiment, in the three-group zoom lens, since the refractive power and the like of, in particular, the first lens group 10 is made to be set properly, the aberrations can be corrected properly while realizing the decrease in thickness of the first lens group 10, thereby making it possible to realize the zoom lens system which is small in size and is able to form images with higher quality, the resulting zoom lens system being able to be preferably used for digital still cameras and the like.

EXAMPLES

Next, specific numerical examples of the zoom lens according to the embodiment will be described below. In the description below, based on the first embodiment of the invention, first to fourth numerical examples will be described altogether.

FIGS. 5(A), 5(B) and 6 show specific lens data (Example 1) which corresponds to the configuration of the zoom lens shown in FIG. 1. In particular, lens data thereof is shown in FIG. 5(A), data related to zooming is shown in FIG. 5(B), and data related to aspherical surfaces is shown in FIG. 6.

Shown in a column of Si (surface number) in the lens data shown in FIG. 5(A) are numbers of i-th (i=1 to 14) surfaces which result when symbols are given to surfaces of constituent lenses of a zoom lens of this example in such a manner as to increase sequentially from an object side surface of a constituent lens situated on closest to as the first surface, toward an image side of the zoom lens. Shown in a column of Ri (radius of curvature) are values of radius of curvature of the i-th surfaces from the object side in such a manner as to correspond to reference characters Ri given in FIG. 1. In addition, similarly, shown in a column of Di (surface-to-surface space) are spaces on the optical axis between a surface Si which constitutes an i-th surface and a surface Si+1 which constitutes an i+1th surface from the object side. Units of values of radius of curvature Ri and surface-to-surface space Di are millimeters (mm). Shown in columns of Ndj and vdj are values of refractive index and Abbe number of j-th (j=1 to 7) optical elements from the object side at the d-line (whose wavelength is 587.6 nm).

In the zoom lens of Example 1, since an space between a first lens group 10 and a second lens group 20 and an space between the second lens group 20 and a third lens group 30 are caused to vary in association with a change in focal length or magnification, values of inter-surface spaces D4, D10 and D12 are made variable. FIG. 5(B) shows values of the inter-surface spaces D4, D10 and D12 at a wide angle end and a telephoto end as data when changing the focal length and hence magnification. In a zoom lens of Example 4, which will be described later on, since a third lens 30 is configured to be fixed, only values of D4 and D10 are shown. In addition, also shown in FIG. 5(B) are values of paraxial focal length f (mm), F number (FNo.) and angle of view $2\omega$ ($\omega$: one half of angle of view) of the whole zoom lens system at the wide angle end and telephoto end. Note that a variable power ratio of the zoom lens of Example 1 is about thee times. This will also be true in Examples 2 to 4, which will be described later on.

In the lens data in FIG. 5(A), a symbol "*" which is given on the left-hand side of the surface numbers denotes that the lens surfaces to which the symbol is given is an aspherical surface. Numerical values in the vicinity of the optical axis are used as the radius of curvature of these aspherical surfaces. Note that in the zoom lens of Example 1, both surfaces (a first surface, a second surface) of a negative lens L11 of the first lens group 10, both surfaces (a ninth lens surface, a $10^{th}$ lens surface) of a single lens L22 of the second lens group 20 and both surfaces of a double convex lens L31 of the third lens group 30 are made into aspherical surfaces.

In numerical values shown as aspherical surface data in FIG. 6, a symbol "E" indicates that a numerical value following the symbol is a power exponent of 10 as a base and that a numerical value represented by an exponential function of 10 as a base is multiplied by a numerical value before the "E." For example, "1.0E-02" indicates "$1.0\times10^{-2}$."

As aspherical surface data, values of respective coefficients K, $A_i$ in an expression of the shape of an aspherical surface expressed by the following expression (A) are shown. Z denotes the length (mm) of a perpendicular which is drawn from a point on the aspherical surface which lies at a position of a height h from the optical axis down to a tangent plane (a plane perpendicular to the optical axis) to an apex of the aspherical surface.

$$Z=C\cdot h^2/\{1+(1-K\cdot C^2\cdot h^2)^{1/2}\}+\Sigma A_i\cdot h^i \quad (A)$$

(i=3 to n, n: integer of 3 or larger)

where,

Z: depth (mm) of aspherical surface;

h: distance (height) (mm) from the optical axis to lens surface;

K: conical constant

C: paraxial curvature=1/R (R: paraxial radius of curvature)

$A_i$: aspherical coefficient in an i-th order.

In addition, an aspherical coefficient is used which includes not only an even-order term but also an odd-order term for each aspherical surface. In particular, in the first lens group 10, the both surfaces (the first surface, the second surface) of the negative lens L11 are made into aspherical shapes, and a coefficient which includes an 16-th order or more term is used for the aspherical coefficient of the aspherical shape. To be specific, the first surface and the second surface are represented effectively by the use of coefficients $A_3$ to $A_{20}$ of degree 3 to 20. As to Example 2, which will be described later on, the $11^{th}$ surface and $12^{th}$ surface are represented by the use of coefficients $A_3$ to $A_{10}$ of degree 3 to 10.

As with the zoom lens according to Example 1 that has been described above, lens data of a zoom lens according to Example 2 are shown in FIGS. 7(A), 7(B) and 8. In addition, similarly, lens data of a zoom lens according to Example 3 are shown in FIGS. 9(A), 9(B) and 10. Furthermore, lens data of a zoom lens according to Example 4 are shown in FIGS. 11(A), 11(B) and 12.

FIG. 13 shows values related to the conditional expressions (1) to (6) which are grouped into the respective examples. It is seen from FIG. 13 that the values of the zoom lenses according to the respective examples all fall within the numerical value ranges of the respective conditional expressions.

FIGS. 14(A) to 14(D) show spherical aberration, astigmatism, distortion and lateral color aberration at the wide angle end of the zoom lens according to Example 1. FIGS. 15(A) to 15(D) show the same aberrations at the telephoto end thereof. Aberrations based at the d-line as a reference wavelength are shown in the respective aberration diagrams. Aberrations based on lines of wavelengths 460 nm and 615 nm are also shown in the spherical aberration diagram. In the astigmatism diagram, a solid line denotes an aberration in a sagital direction, and a broken line denotes an aberration in a tangential direction. FNO. denotes an F number value, and ω denotes a half of an angle of view.

Similarly, aberrations of the zoom lens according to Example 2 are shown in FIGS. 16(A) to 16(D) (at the wide angle end) and in FIGS. 17(A) to 17(D) (at the telephoto end). In addition, similarly, aberrations of the zoom lens according to Example 3 are shown in FIGS. 18(A) to 18(D) (at the wide angle end) and in FIGS. 19(A) to 19(D) (at the telephoto end). Furthermore, aberrations of the zoom lens according to Example 4 are shown in FIGS. 20(A) to 20(D) (at the wide angle end) and in FIGS. 21(A) to 21(D) (at the telephoto end).

As is seen from the numerical value data and aberration diagrams, in each of the examples, the decrease in thickness of the first lens group and the decrease in overall length of the zoom lens are realized, and the aberrations are corrected properly, whereby the zoom lenses can be realized which are small in size and are able to form images with higher quality and which can therefore preferably be used for digital still cameras and the like.

Note that the invention is not limited to the embodiment and the examples which have been described heretofore and hence can be modified variously. For example, values of the radius of curvature, surface-to-surface space and refractive index of each lens are not limited to those indicated in the respective numerical examples and hence can take other values.

This application claims foreign priority from Japanese Patent Application No. 2006-223970, filed Aug. 21, 2006, the entire disclosure of which is herein incorporated by reference.

What is claimed is:

1. A zoom lens comprising: in order from an object side thereof,
a first lens group having a negative refractive power, the first lens group comprising in order from an object side thereof, a negative lens having at least one aspherical surface and having a concave surface on an image side thereof, and a positive meniscus lens having a convex surface on the object side thereof;
a stop;
a second lens group having a positive refractive power; and
a third lens group having a positive refractive power, wherein
a magnification of the zoom lens is varied from a wide angle end to a telephoto end by changing a space between the first lens group and the second lens group and a space between the second lens group and the third lens group, and
the zoom lens satisfies conditional expressions:

$$N2>1.95 \quad (1)$$

$$0.2<Da/|f1|<0.3 \quad (2)$$

$$2.0<|f1|/fw<3.0 \quad (3)$$

wherein
N2 is a refractive index of the positive meniscus lens of the first lens group at the d-line;
Da is a distance along an optical axis between an object side apex of the negative lens and an image side apex of the positive meniscus lens of the first lens group;
f1 is a focal length of the first lens group; and
fw is a focal length of the zoom lens at the wide angle end; and
wherein the second lens group has a two-sub group, three-lens configuration which consists of: in order from the object side thereof, a cemented lens consisting of a double convex lens and a negative lens having a concave surface on the object side thereof; and a positive single lens having at least one aspherical surface.

2. The zoom lens according to claim 1, further satisfying conditional expressions:

$$N1>1.75 \quad (4)$$

$$10<v1-v2<19 \quad (5)$$

wherein
N1 is a refractive index of the negative lens of the first lens group at the d-line;
v1 is an Abbe number of the negative lens of the first lens group at the d-line; and
v2 is an Abbe number of the positive meniscus lens of the first lens group at the d-line.

3. The zoom lens according to claim 1, further satisfying a conditional expression:

$$2.0<|f1|/fw<2.4 \quad (6).$$

4. The zoom lens according to claim 2, further satisfying a conditional expression:

$$2.0<|f1|/fw<2.4 \quad (6).$$

5. The zoom lens according to claim 2, wherein the aspherical surface of the firs lens group has a shape defined by an aspheric coefficient including a coefficient in an odd-order term.

6. The zoom lens according to claim 2, wherein the aspherical surface of the firs lens group has a shape defined by an aspheric coefficient including a coefficient in a 16-th or more order term.

7. The zoom lens according to claim 3, wherein the aspherical surface of the first lens group has a shape defined by an aspheric coefficient including a coefficient in an odd-order term.

8. The zoom lens according to claim 3, wherein the aspherical surface of the first lens group has a shape defined by an aspheric coefficient including a coefficient in a 16-th or more order term.

9. The zoom lens according to claim 4, wherein the aspherical surface of the first lens group has a shape defined by an aspheric coefficient including a coefficient in an odd-order term.

10. The zoom lens according to claim 4, wherein the aspherical surface of the first lens group has a shape defined by an aspheric coefficient including a coefficient in a 16-th or more order term.

11. The zoom lens according to claim 1, wherein the aspherical surface of the first lens group has a shape defined by an aspheric coefficient including a coefficient in an odd-order term.

12. The zoom lens according to claim 1, wherein the aspherical surface of the first lens group has a shape defined by an aspheric coefficient including a coefficient in a 16-th or more order term.

13. An imaging apparatus comprising a zoom lens according to claim 1.

14. An imaging apparatus comprising a zoom lens according to claim 2.

15. An imaging apparatus comprising a zoom lens according to claim 3.

16. An imaging apparatus comprising a zoom lens according to claim 4.

17. An imaging apparatus comprising a zoom lens according to claim 11, wherein the aspherical surface of the first lens group has a shape defined by an aspheric coefficient including a coefficient in a 16-th or more order term.

* * * * *